United States Patent

Laurent et al.

[11] Patent Number: 5,828,712
[45] Date of Patent: *Oct. 27, 1998

[54] COOLANT WATER FLOW RATE TEST WITH RUBIDIUM NUCLEAR TRACER FOR REACTORS

[75] Inventors: Martin Sullivan Laurent; Michael Eildon Ball; Lynn Lawrence Sundberg; James Leon Simpson, all of San Jose, Calif.

[73] Assignee: General Electric Company, San Jose, Calif.

[ * ] Notice: The terminal 53 months of this patent has been disclaimed.

[21] Appl. No.: 819,908

[22] Filed: Jan. 13, 1992

[51] Int. Cl.$^6$ .................................................. G21C 17/032
[52] U.S. Cl. ...................... 376/246; 376/245; 73/861.05; 73/861.06; 73/861.07; 250/302; 250/303
[58] Field of Search ....................... 376/245, 246; 73/861.05, 861.06, 861.07; 250/302, 303

[56] References Cited

U.S. PATENT DOCUMENTS

| | | | |
|---|---|---|---|
| 1,299,539 | 4/1919 | Bailey | 73/861.07 |
| 1,299,540 | 4/1919 | Bailey | 73/861.07 |
| 3,435,660 | 4/1969 | Sternberg | 73/23.1 |
| 3,435,678 | 4/1969 | Sternberg | 73/194 |
| 3,727,048 | 4/1973 | Haas | 250/43.5 MR |
| 3,988,926 | 11/1976 | Haas | 73/15.4 |
| 4,055,083 | 10/1977 | Haas | 73/194 E |
| 4,153,418 | 5/1979 | Haas | 23/232 R |
| 4,167,870 | 9/1979 | Haas | 73/194 |
| 4,811,741 | 3/1989 | Shell et al. | 128/691 |

FOREIGN PATENT DOCUMENTS

| | | | |
|---|---|---|---|
| 2645639 | 10/1990 | France | 73/861.07 |
| 57-64110 | 4/1982 | Japan | 73/861.05 |

Primary Examiner—Donald P. Walsh
Assistant Examiner—Chrisman D. Carroll
Attorney, Agent, or Firm—Robert R. Schroeder

[57] ABSTRACT

Fluid flow rates are determined with a nonradioactive tracer agent in the operation of a water cooled nuclear fission reactor employed for driving electrical power generators. The technique is proposed for use to routinely calibrate other flow measuring means such as restricted flow nozzles.

5 Claims, 1 Drawing Sheet

COOLANT WATER FLOW RATE TEST WITH RUBIDIUM NUCLEAR TRACER FOR REACTORS

FIELD OF THE INVENTION

This invention is concerned with means for accurately determining the flow rate of feedwater into a water cooled, nuclear fission reactor plant. The invention is directed generally to steam producing, water cooled nuclear fission reactors, such as boiling water reactors, which are coupled with steam turbine driven electrical generators, and in particular with a measure for optimizing their operation for maximum power generating effectiveness.

BACKGROUND OF THE INVENTION

It has been established by operating experience that the rate of supplying feed water to a water cooled nuclear fission reactor is a significant factor for the power rating of such reactor plants in terms of electrical output when utilizing their produced steam for driving turbine powered electrical generators. Accordingly, various measures have been proposed and considered for accurately determining or measuring the flow rate of feedwater into the pressure vessel of water cooled nuclear fission reactor plant such as a boiling water reactor.

Feedwater in a water cooled nuclear fission reactor plant typically comprises condensate water from steam generated by the nuclear reactor which has been passed through steam driven turbines, condensed and, combined with any needed makeup water, returned to the reactor pressure vessel as coolant water for simultaneously cooling the fuel core while again forming steam for driving turbines. This system accordingly comprises a coolant water/steam circuit for continuously cycling water, as liquid and/or steam, through a course including: into the reactor pressure vessel for circulation therein through the heat producing fuel core to form steam from a portion thereof and thereby cool the fuel, then the formed steam passes through the turbines for driving same, next the turbine expended steam continues through a condenser(s) for cooling to liquid water whereupon the water condensate is returned, with any needed makeup water, to the reactor pressure vessel as feedwater for repeating the cycling of coolant water though this circuit.

The flow rate, or volume, of such feedwater supplied as coolant to the reactor pressure vessel is typically monitored and in turn regulated because of its effect upon the effectiveness or efficiency of the overall reactor operation in generating electrical power. A flow restricting nozzle is commonly employed in the feedwater conduit supplying coolant water into the reactor pressure vessel whereby the flow rate can be continuously or routinely measured. However, it has been found that over time this means does not provide sufficiently accurate readings due to insoluble deposits progressively accumulating within the orifice of the restricted nozzle units, such as oxides and minerals incrustation. It has therefore become a common practice to periodically undertake to calibrate the nozzle orifice flow rate by means such as the use of radioactive tracers, for example the use of the radionuclide sodium-24. This tracer method was found to be an effective means for independently calibrating unknown flow measuring instrumentation such as the restrictive nozzle units, for example flow rates are usually measured to a precision of about 0.5 percent applying a radioactive tracer such as sodium-24.

Nevertheless, while this radioactive tracer technique provides relatively accurate flow rate determinations within a conduit, there are a number of shortcomings to this means for calibration restrictive nozzle flow rates within a nuclear reactor system. For instance, high radiation dose rates around injection equipment causes significant personnel exposure, and makes working on the equipment difficult or hazardous. An isotope with a short half-life is normally used so that analysis must be complete in a short period of time while enough counts are present to maintain good statistics. The handling of a radioactive source also requires more manpower to prepare the application of a radioactive trace including the injection and control procedure.

Other trace agents or means have been considered or used, but have been determined not to be suitable for one reason or another, such causing corrosion within the coolant water system, or an inability to produce accurate and uniform results.

SUMMARY OF THE INVENTION

This invention comprises a method for measuring the flow rate of coolant water within the coolant water system of a water cooled nuclear fission reactor plant, whereby conventional flow rate determining means such as restricted nozzle devices periodically can be accurately calibrated. The invention utilizes a novel tracing material which is not radioactive, and is adept at producing effective and accurate flow rate determinations.

DETAILED DESCRIPTION OF THE INVENTION

Figure 1:
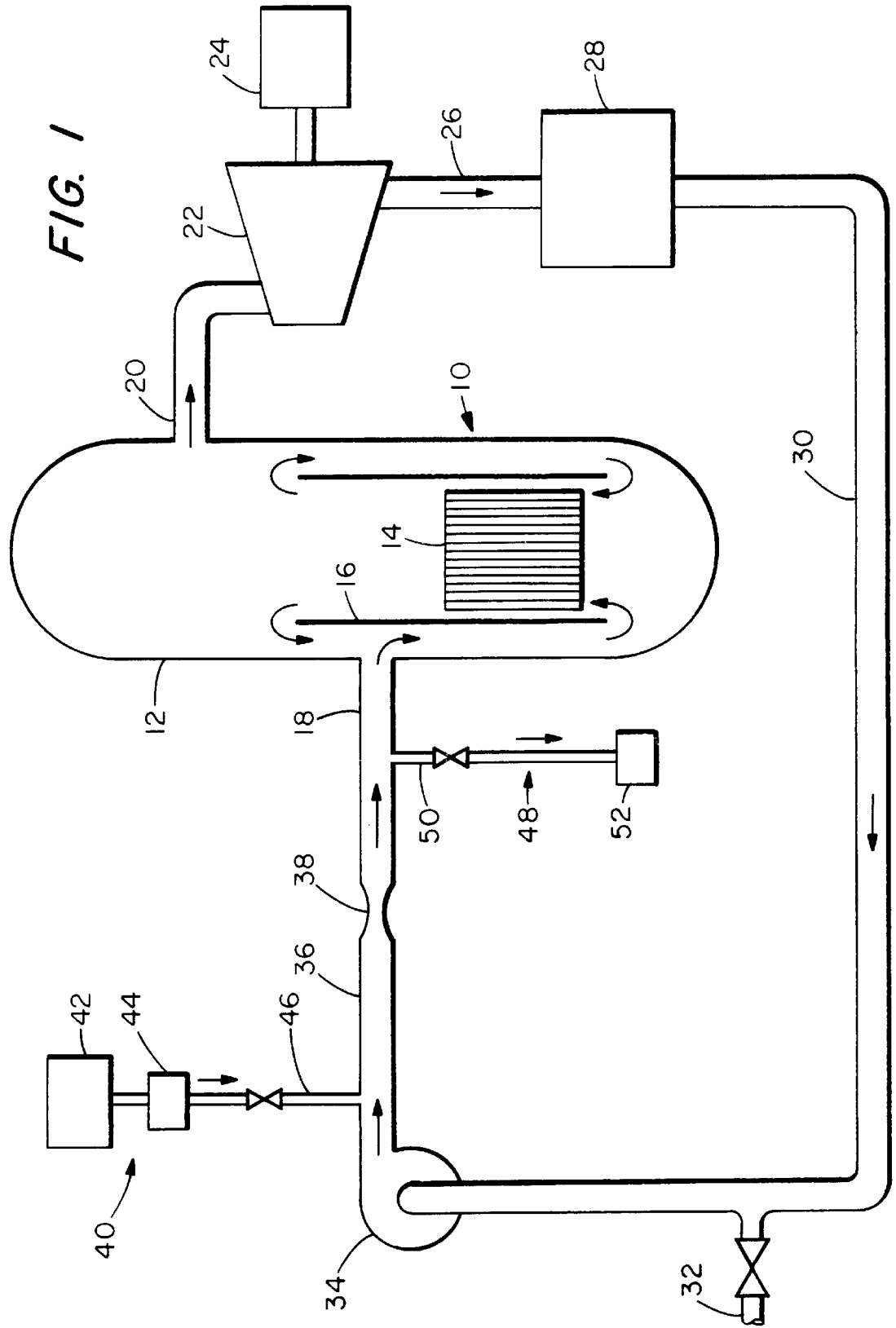
FIG. 1 of the drawing is a flow diagram of a coolant water circuit of a water cooled nuclear fission reactor plant, which has been modified for the practice of the subject invention.

Referring to the drawing, a typical water cooled nuclear fission reactor plant 10, such as a boiling water reactor, comprises a reactor pressure vessel 12 containing a heat producing core 14 of fissionable fuel which is surrounded by a annular shroud 16 providing a flow controlling baffle. The coolant water circulating system for the reactor plant 10 comprises a feedwater inlet 18 for supplying steam forming, coolant water to the reactor pressure vessel 12. Upon entering the pressure vessel 12, the coolant water flows downward about the outside of the annular shroud 16, then around the bottom of the shroud and up through the heat producing fuel core 14 where a portion thereof is converted to steam. The remaining liquid coolant water flows over the top of the shroud and then downward, along with coolant introduced though feedwater inlet 18, outside of the shroud for continuously repeating this circuit within the pressure vessel.

The produced steam exits from the reactor pressure vessel 12 though the steam outlet 20 comprising a conduit which supplies the reactor produced steam to a steam propelled turbine(s) 22, which in turn drives an electrical generator(s) 24. Spent steam from the turbine 22 is passed in conduit 26 to a steam condenser(s) 28, where the spent steam is cooled and condensed, and the resultant liquid water condensation is recirculated back to the pressure vessel 12 through return conduit 30. Makeup water supply 32 provides added water needed to compensate for any losses of water or steam within the coolant system. Pump 34 provides the means for impelling coolant water continuously through the coolant water system. The recirculated coolant water flows from the return conduit 30 into the reactor pressure vessel 12 through the feedwater return conduit 36 and inlet 18.

A restricted orifice nozzle unit 38 is commonly employed in such nuclear reactor plant coolant water circuits for determining the flow of coolant water into the reactor pressure vessel. Flow rate measurements can be taken substantively continuously, or in frequent periods. Flow rate can be ascertained by calculating the ΔP water flow per hour through the restriction of the nozzle.

In accordance with this invention, a water solution of a soluble solution of rubidium salt in a known high concentration, and a known quantity thereof is injected into the feedwater flowing in the return conduit 36 to the reactor pressure vessel and mixing with the coolant water. Samples of the coolant water containing the injected rubidium salt are taken at a known distance downstream in the return conduit 36 which is sufficient to achieve homogeneous mixing and dispersion of the rubidium salt in the coolant water. Suitable soluble rubidium salts include nitrate, nitride, nitrite, carbonate and oxalate, among others.

Referring to the drawing, a rubidium salt injection means 40 typically comprise a solution supply or reserved tank 42, a metering pump 44 and injection tube 46 with control valve. A downstream sampling device 48 in the return conduit 36 for retrieving specimens comprises a withdrawing tube with control valve 50 feeding into a specimen sample receptacle 52.

Upon obtaining sampled specimens of the coolant water injected with a known quantity and concentration of a rubidium salt, a reference rubidium salt solution is prepared by accurately diluting an aliquot of the same solution preparation a portion of which was injected into the coolant water passing through the return conduit. The dilution should be to the degree approximating the expected concentration of the sampled specimens. The sampled specimens of coolant water containing injected rubidium salt are evaluated and compared with the standard reference solution, and the coolant flow rate determined by means of the formula:

$$\text{feedwater flow} = \frac{\text{injection flow} \times \text{injection cponcentration}}{\text{feedwater concentration}}$$

The reference solution standard and sampled specimens can both be analyzed and compared by suitable chemical means such as ion chromatography or atomic absorption to ensure their like concentrations for the determination. With this technique a high degree of accuracy can be achieved in ascertaining fluid flow rate.

Thus, the use of nonradioactive rubidium as the tracer overcomes the disadvantages of high radiation exposure, and time limitations since the common radioactive tracers have relatively short half-lives such as sodium-24 which decays with a fifteen hour half-life. Moreover, the rubidium salt tracers are not significantly corrosive as are other tracer compositions considered, such as lithium.

EXAMPLE

An example for the practice of this invention of a test using rubidium tracer comprises the following steps:

1. A solution of a rubidium salt, such as rubidium nitrate, is made in a polycarbonate container. Assuming typical plant with a feedwater flow of 10,000,000 lb/hr at 100% power, a solution of 18,900 ppm rubidium is used with an injectant flow rate of 20 grams/minute. Commonly there are two feedwater loops so the expected concentration of rubidium in the loop being tested is then 10 ppb from the equation $$FW_{flow} * FW_{con} = INJ_{flow} * INJ_{con}$$

where
$FW_{flow}$=feedwater flow in the tested loop
$FW_{con}$=feedwater rubidium concentration
$INJ_{flow}$=injection flow
$INJ_{con}$=injection rubidium concentration or $$FW_{con} = \frac{INJ_{flow} * INJ_{con}}{FW_{flow}}$$

$$= \frac{(20 \text{ g/min}) * (18,900 \text{ ppmRubudium}) * (60 \text{ min/hr})}{(5,000,000 \text{ lb/hr}) * \left(\frac{453.6 \text{ g}}{\text{lb}}\right)}$$

$$= 0.010 \text{ ppm or } 10 \text{ ppb}$$

To make four liters of such a solution would require 130 grams of rubidium nitrate diluted to 4,000 grams with ultrapure water.

2. The injection solution is injected through a small tube such as a ⅛ inch line into the feedwater, upstream of the flow nozzle, using a high precision metering pump. The injection solution is set on a calibrated industrial balance and the rate of flow is measured and recorded with a computer interfaced to the balance. The injection line is as short as practical.

3. The rubidium solution is injected for a period of time prior to sampling to obtain equilibrium. After this period of time, samples are collected from a sample point downstream of the flow nozzle being calibrated. The sample point is located far enough from the injection point to assure mixing in the feedwater*. The sample line is ¼ inch

* (distance downstream) / (pipe diameter) > 200 stainless steel in which turbulent flow is maintained (greater than 1200 ml/min). Three or four samples, each about four liters, are collected in polycarbonate containers. Each sample is collected over about a ten minute period and capped. A background sample is taken from the feedwater loop not being tested.

4. Steps 2. and 3. are repeated for the other feedwater loop.

5. An aliquot of the injection solution is taken for preparation of a standard solution. The standard solution is made to be approximately the same as the expected sample concentrations (10 ppb) by performing gravimetric dilutions. Many dilution sequences are possible and one example is:

dilute 1 gram of standard solution to 1000 grams resulting in a solution of 18.9 ppm rubidium dilute 4 grams of the above solution to 8000 grams resulting in a standard that is 9.45 ppb rubidium. A volume of standard sufficient to run all samples is made. Because the solutions are weighted to high accuracy, there is negligible uncertainty introduced in making the standard (~0.01%).

6. The samples may be analyzed to a number of chemical techniques including ion chromatography and atomic absorption. In the case of ion chromatography, the samples and standard are alternated for analysis, for example five determinations of the standard followed by five determinations of the sample. This pattern is repeated if necessary until the error in a regression analysis of the peak areas between the standards and samples is less than 0.25%. The general equation is of the form:

$$A_0 * R + A_1 * N + CONSTANT = PEAK \text{ AREA}$$

where:
$A_0$=first coefficient
$R$=run number (related to time)

$A_1$=second coefficient

N=0 for standards, 1 for samples

PEAK AREA=calculated peak area

The values of $A_0$ and $A_1$ are determined by regression fit along with the error on the coefficients. $A_0$ defines the slope of the line fit to the date and $A_1$ the step change between the standard and the feedwater sample. Multiplying the standard concentration by the value defined by this coefficient is the feedwater rubidium concentration in ppb. When the error on this coefficient is less than 0.25%, the analysis is considered successful.

7. Feedwater flow in each loop is determined from the equation:

$$FW_{flow} = \frac{INJ_{flow} * INJcon}{FW_{con}}$$

The values obtained from each sample period are then compared to the values returned by the nozzle. The errors from $INJ_{flow}$ and $INJ_{con}$ are small with the uncertainty of $FW_{con}$ the limiting factor in determining $FW_{flow}$. The overall error in the determination is expected to be less than 0.5%

What is claimed is:

1. A method for measuring the flow rate of coolant water within the coolant water system of a boiling water nuclear fission reactor, consisting essentially of the combination of steps of:

preparing a solution of a soluble salt of rubidium of a known concentration; injecting a known quantity of the prepared soluble rubidium salt solution into a feedwater conduit of a coolant water system of the boiling water nuclear fission reactor;

sampling coolant water containing injected solution in the feedwater conduit a predetermined distance downstream from the location of the rubidium salt solution injection;

preparing a reference solution of the rubidium salt by accurately diluting an aliquot of the injected solution to approximately the expected concentration of the sampled coolant water containing injected solution; and analyzing and comparing the reference solution with the sampled coolant water.

2. The method for measuring the flow rate of coolant water within the coolant water system of a boiling water nuclear fission reactor of claim 1 wherein the rubidium salt is selected from the group consisting of rubidium nitrate, rubidium carbonate and rubidium oxalate.

3. The method for measuring the flow rate of coolant water within the coolant water system of a boiling water nuclear fission reactor of claim 1 wherein the rubidium salt is rubidium nitrate.

4. The method for measuring the flow rate of coolant water within the coolant water system of a boiling water nuclear fission reactor of claim 1 wherein the coolant water flow rate is calcuated with the formula:

$$\text{coolant water flow} = \frac{\text{injection flow} \times \text{injection concentration}}{\text{coolant water concentration}}$$

5. A method for measuring the flow rate of coolant water within the coolant water system of a boiling water nuclear fission reactor, consisting essentially of the combination of steps of:

preparing a solution of a soluble salt of rubidium of a known concentration;

injecting a known quantity of the prepared soluble rubidium salt solution of a known concentration into a feedwater conduit of a coolant water system of the boiling water nuclear fission reactor;

taking a sample specimen of coolant water containing injected. solution in the feedwater conduit at a location a predetermined distance from the location of the rubidium salt solution injection;

preparing a reference solution of the same rubidium salt by accurately diluting an aliquot of the injected solution to approximately the expected concentration of the sampled coolant water containing injected solution;

analyzing and comparing the reference solution with the sampled coolant water; and calculating the coolant water flow rate with the formula:

$$\text{coolant water flow} = \frac{\text{injection flow} \times \text{injection concentration}}{\text{coolant water concentration}}$$

* * * * *